United States Patent
Brandt et al.

(10) Patent No.: US 6,318,405 B1
(45) Date of Patent: Nov. 20, 2001

(54) FUEL PRESSURE REGULATOR WITH FLUIDIC ASSIST

(75) Inventors: Timothy B. Brandt; Allen L. Hudson, both of West Des Moines, IA (US)

(73) Assignee: Mahle-Parr Filter Systems, Inc., Des Moines, IA (US)

( * ) Notice: Subject to any disclaimer, the term of this patent is extended or adjusted under 35 U.S.C. 154(b) by 0 days.

(21) Appl. No.: 09/521,136

(22) Filed: Mar. 8, 2000

(51) Int. Cl.⁷ ................................................. G05D 16/02
(52) U.S. Cl. ...................................... 137/484.2; 137/484.4
(58) Field of Search ................................ 137/484.2, 484.4

(56) References Cited

U.S. PATENT DOCUMENTS

| | | |
|---|---|---|
| 3,439,873 | 4/1969 | Relf . |
| 3,441,050 | 4/1969 | Sanchez . |
| 3,511,266 * | 5/1970 | Philpot . |
| 3,513,872 * | 5/1970 | Tupper et al. . |
| 3,664,369 * | 5/1972 | Johnson ............................ 137/484.4 |
| 5,012,784 | 5/1991 | Fehrenbach . |
| 5,078,167 | 1/1992 | Brandt et al. . |
| 5,396,918 | 3/1995 | Parker . |
| 5,402,817 | 4/1995 | Bueser . |
| 5,584,318 | 12/1996 | Brandt . |
| 5,649,561 | 7/1997 | Brandt . |
| 5,881,765 * | 3/1999 | Turney et al. .................... 137/484.4 |
| 6,006,781 | 12/1999 | Brandt et al. . |

* cited by examiner

*Primary Examiner*—Stephen M. Hepperle
(74) *Attorney, Agent, or Firm*—Henderson & Sturm LLP

(57) ABSTRACT

A pressure regulator body having an inlet port and and an outlet port having a pressure regulator valve disposed in said pressure regulator body, said valve being moveable between and open and a closed position and being responsive to open or close the valve based at least in part on a differential pressure between the pressure in the outlet port and the pressure in the inlet port. A chamber in the pressure regulator body on the outlet port side of the valve has a conduit extending from the outlet port into said chamber. This conduit has an inside and an outside and an open end which is spaced from the valve whereby flow through the conduit flowing will pull fluid from the chamber which is located radially outwardly from said conduit as well as allowing flow directly from the valve to the open end in the conduit. The effect of this arrangement is to quickly cause less flow to a fuel tank and more flow to an engine during a desired rapid acceleration of rpm of such engine. Furthermore, in a preferred embodiment, a control spring is disposed the chamber for biasing the valve toward the closed position thereof.

11 Claims, 9 Drawing Sheets

FUEL PRESSURE REGULATOR WITH FLUIDIC ASSIST

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

This invention relates to fuel pressure regulators for use in fuel delivery systems of vehicles, and more particularly to diaphragmed fuel pressure regulators.

2. Description of the Related Art

Fuel pressure regulators for use in fuel delivery systems of vehicles are well known in the art. In a typical fuel delivery system for a vehicle, the fuel delivery system includes a fuel tank, a fuel pump, a fuel filter, a fuel pressure regulator, a fuel return line, and a fuel metering device for supplying the appropriate amount of fuel to the vehicle engine.

The fuel pump, typically electrically operated, constantly draws fuel through an inlet disposed within the fuel tank. The fuel is forced through the pump outlet where it enters a fuel filter/regulator assembly through a fuel supply port. Most of the fuel passes through the fuel filter and out through an outlet port that is connected to a fuel line that leads to a fuel metering device, such as a carburetor or fuel injectors, for supplying fuel to the vehicle engine. Due to the fuel pump constantly pumping fuel into the fuel line at flow rates usually higher than what is required by the engine, a device is required to return excess flow back to the tank to avoid excess pressure buildup. Most modern fuel delivery systems require that the pressure in the fuel metering device remain relatively constant, within certain tolerances. As such, a fuel pressure regulator is required to regulate the pressure in the fuel line. The fuel pressure regulator acts as a pressure release valve by enabling the excess fuel to be returned to the fuel tank, thus relieving the excess pressure in the fuel line. The fuel pressure regulator acts by opening a valve member when the pressure on the upstream side of the regulator exceeds a predetermined pressure level. When the pressure on the upstream side of the regulator returns to the predetermined pressure level, the valve member closes. Thus the fuel pressure regulator acts to keep the pressure in the fuel line relatively constant within certain prescribed tolerances.

Most fuel pressure regulators utilize a diaphragm and valve assembly which act to seal the upstream side of the regulator from the downstream side of the regulator. When the pressure on the upstream side of the diaphragm exceeds a predetermined pressure differential, the diaphragm is caused to deflect thus causing a valve member to open to release fuel through the regulator and out through the return line where it is returned to the fuel tank. Other types of pressure regulators can be used effectively in the present invention and can be considered interchangeable with the particular fuel regulator shown in the drawings.

Prior fuel systems have limitations. For example, when attempting to accelerate quickly the high demand for fuel to the injectors tends to decrease the system fuel pressure because of the typical response of the regulator to such conditions.

In a conventional pressure regular (see FIG. 11), the flow of fuel back to the fuel tank increases as the reference pressure (P) in the fuel line to the engine increases. More flow through the pressure regulator back to the fuel tank means increased fuel line pressure per the typical flow curve (see FIG. 11). So when a large burst of fuel is demanded by the engine upon acceleration, the reference pressure (P) decreases due to the flow to the fuel tank decreasing per the typical flow curve (see FIG. 11). Pressure at the fuel injectors will often drop by 3–5 psi due to the function of a typical pressure regulator. Consequently, there is a need for a fuel pressure regulator which does not have this disadvantage.

BRIEF SUMMARY OF THE INVENTION

The present invention relates to a pressure regulator body having an inlet port and and an outlet port having a pressure regulator valve disposed in said pressure regulator body, said valve being moveable between and open and a closed position and being responsive to open or close the valve based at least in part on a differential pressure between the pressure in the outlet port and the pressure in the inlet port. A chamber in the pressure regulator body on the outlet port side of the valve has a conduit extending from the outlet port into said chamber, This conduit has an inside and an outside and an open end which is spaced from the valve whereby flow through the conduit flowing will pull fluid from the chamber which is located radially outwardly from said conduit as well as allowing flow directly from the valve to the open end in the conduit. The effect of this arrangement is to maintain closer to optimal pressure to the fuel injectors during a desired rapid acceleration of the vehicle. Furthermore, in a preferred embodiment, a control spring is disposed the chamber for biasing the valve toward the closed position thereof.

Therefore, an object of the present invention is the provision of an improved fuel pressure regulator.

Another object of the invention is to provide a fuel pressure regulator that inherently provides a more constant pressure under all operating conditions to the injectors.

Other objects, advantages, and novel features of the present invention will become apparent from the following detailed description of the invention when considered in conjunction with the accompanying drawings.

DETAILED DESCRIPTION OF THE INVENTION

Figure 1:
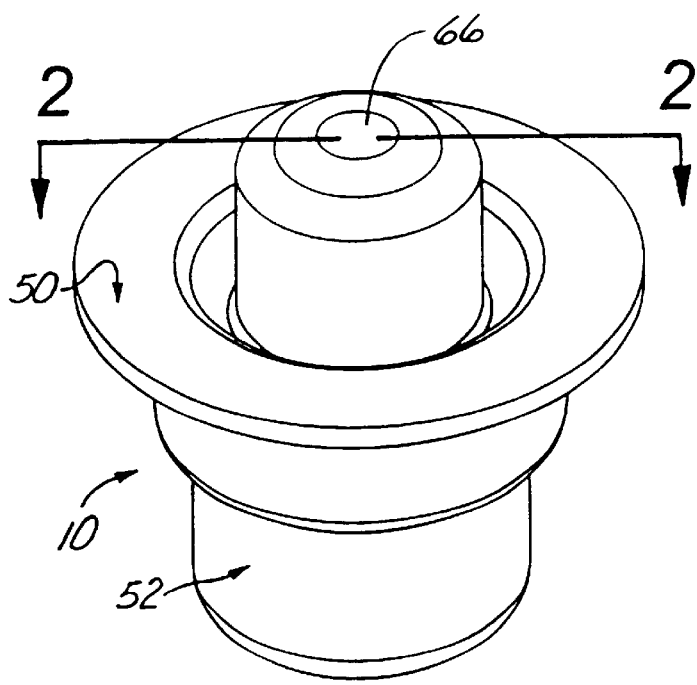
FIG. 1 is a perspective view of the fuel pressure regulator of the present invention.

Referring now to the drawings, wherein like reference numerals designate identical or corresponding parts throughout the several views, FIG. 1 shows a perspective view of the fuel pressure regulator (10) of the present invention.

Figure 4:
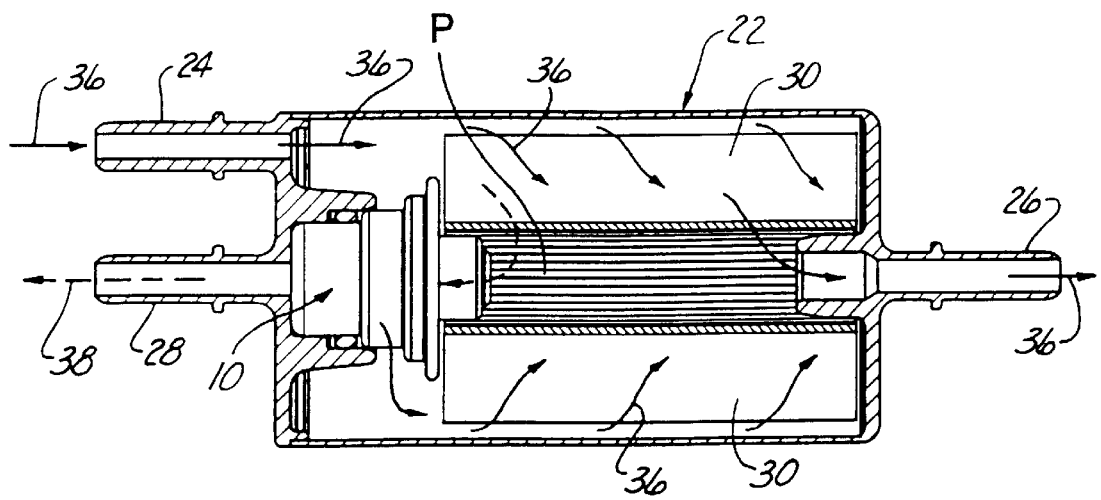
FIG. 4 is a cross-sectional view of the fuel pressure regulator of the present invention shown disposed in a fuel filter/regulator housing.
Figure 5:
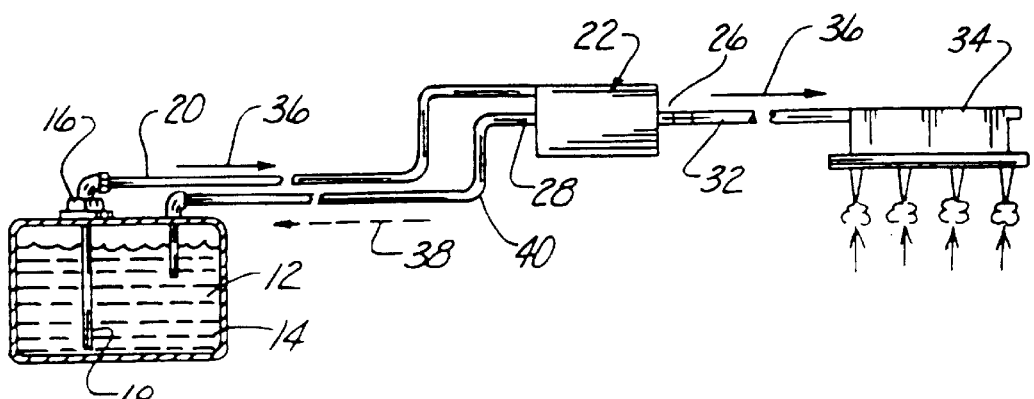
FIG. 5 is a schematic illustration of a typical fuel supply system for a vehicle.

In a typical fuel delivery system of a vehicle, as illustrated in FIG. 5, the fuel delivery system includes a fuel tank (12) with liquid fuel (14) therein. A fuel pump (16), typically electrically operated, constantly draws fuel (14) through the pump inlet (18) disposed within the tank (12). The fuel (14) is forced under pressure through the pump outlet (20) where it enters the fuel filter/regulator housing (22). Referring now to FIG. 4, the fuel pressure regulator (10) is shown disposed within the fuel filter/regulator housing (22) which includes a fuel supply port (24), a fuel outlet port (26) and a fuel return port (28). A fuel filter (30) is retained withing the fuel filter/regulator housing (22) for filtering particle contaminates from the fuel (14). When the fuel (14) enters the fuel filter/regulator housing (22) through the supply port (24), the fuel is forced through the fuel filter (30) and out through the outlet port (26) that is connected to a fuel line (32) (FIG. 5) leading to a fuel metering device (34) such as a carburetor or fuel injectors for supplying fuel to the vehicle engine (not shown). Due to the fuel pump (16) constantly pumping fuel into the system at flow rates usually higher than what is required by the engine, the fuel pressure regulator (10) acts as to regulate the pressure in the fuel line (32) by opening and closing at predetermined pressure levels to keep the pressure in the fuel line (32) relatively constant within certain tolerances. The fuel flow through the fuel delivery system is shown in FIGS. 4 and 5 with the solid arrow lines (36) indicating the fuel flow when the pressure regulator (10) is in a closed position and the dashed arrow lines (38) indicating the fuel flow when the pressure regulator (10) is in an open position. In FIG. 5, it can be seen that when the pressure regulator (10) is in the open position, the fuel (14) passes through the pressure regulator (10) out through the return port (28) where it is returned to the fuel tank (12) by the return line (40).

Figure 3:
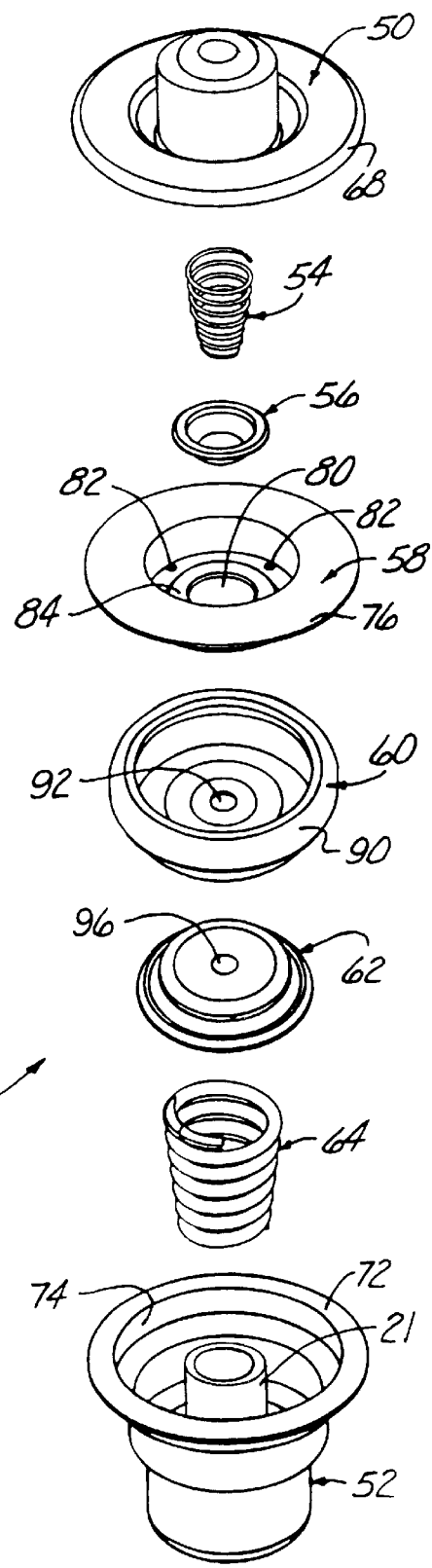
FIG. 3 is an exploded perspective view of the fuel pressure regulator of the present invention.
Figure 2:
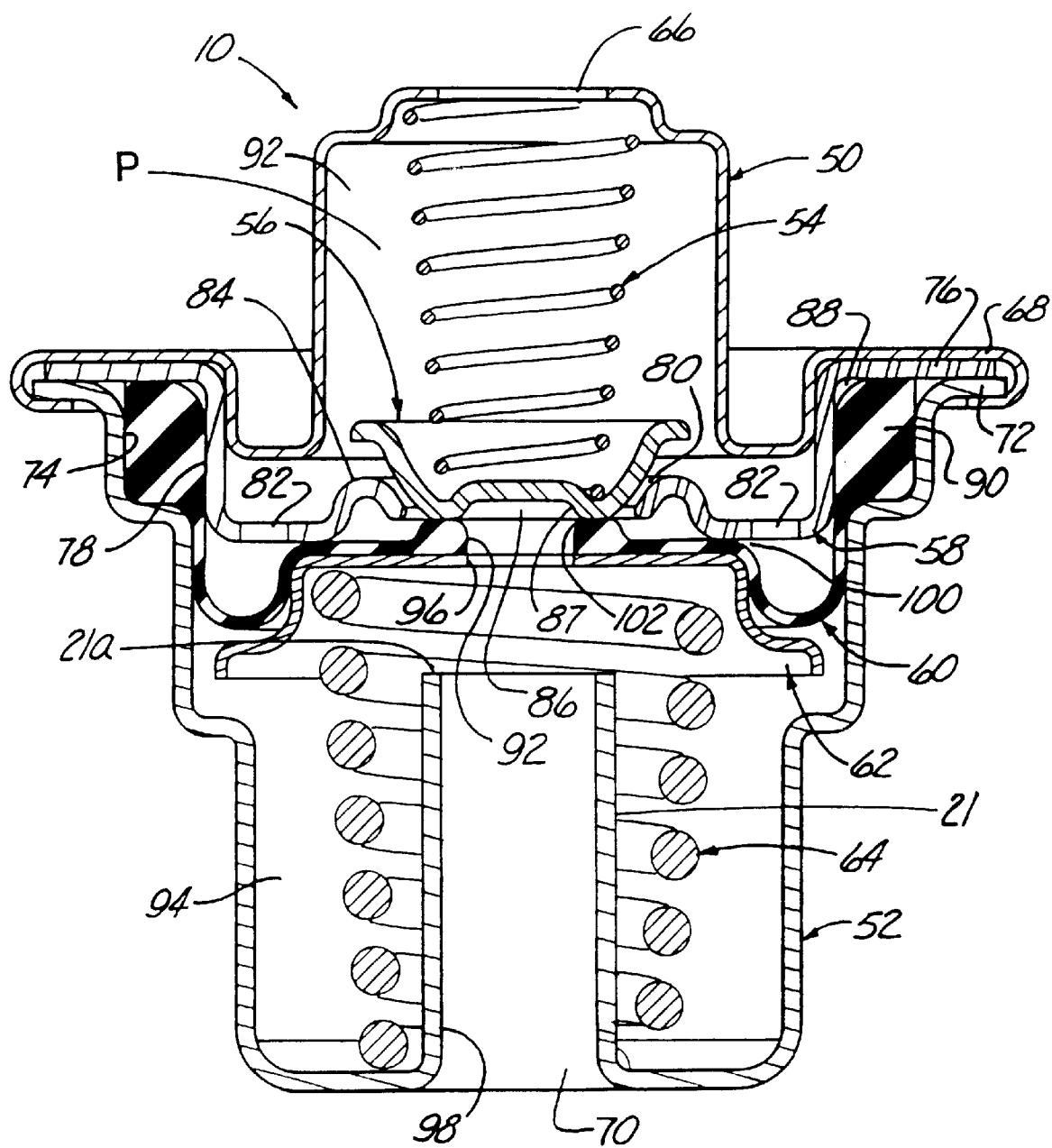
FIG. 2 is a cross-sectional view of the fuel pressure regulator of a preferred embodiment of the present invention taken along lines 2—2 of FIG. 1.

The internal components of the fuel pressure regulator (10) are shown in FIGS. 2 and 3. FIG. 2 is a cross sectional view taken along lines 2—2 of FIG. 1. FIG. 3 is an exploded perspective view of the fuel pressure regulator (10). In the preferred embodiment, the fuel pressure regulator (10) includes a top or first cover (50), a bottom or second cover (52), a seat spring (54), a valve member (56), an end plate (58), a diaphragm (60), a diaphragm backing plate (62), and a control spring (64).

The first cover (50) includes an inlet port (66) and an annular flange (68). The second cover (52) includes an outlet port (70) conduit (21) and open end (21a), an annular flange (72), and an annular interior periphery (74). Disposed below and receivingly retained by the first cover (50) is one end of the seat spring (54) (FIG. 2). The other end of the seat spring (54) is receivingly retained by the cup-shaped valve member (56). Open end (21a) can also be called an open portion (21a).

The end plate (58) includes an annular flange (76) and an annular exterior periphery (78). The end plate (58) further includes a central aperture (80) and preferably four radially spaced apertures (82). Around the central aperture (80) is a raised annular lip (84). The cup-shaped valve member (56) is disposed axially over the central aperture (80) of the end plate (58) (FIG. 2). The seat spring (54) receivingly restrained by the cup-shaped valve member (56) acts to bias the valve member (56) within the annular lip (84) of the end plate (58). It is preferred that the underside of the valve member (56) includes an indent (86), thereby creating an annular sealing surface (87). The purpose of the indent (86) and annular sealing surface (87) of the valve member (56) will be discussed later.

The annular flange (76) of the end plate (58) is of an outside diameter less than the outside diameter of the annular flange (72) of the second cover (52), but is of sufficient outside diameter such that the end plate (58) is supportable by the annular flange (72) of the second cover (52) (see FIG. 2). The annular exterior periphery (78) of the end plate (58) is of an outside diameter less than the annular interior periphery (74) of the second cover (52) such that an annular area (88) is defined therebetween (FIG. 2).

The diaphragm (60), preferably of an elastomeric material, includes an annular flange (90) and a central aperture (92). The inside and outside diameters of the annular flange (90) of the diaphragm (60) are of such dimension that the annular flange (90) fits snugly within the annular area (88) between the annular interior periphery (74) of the second cover (52) and the annular exterior periphery (78) of the end plate (58). When the annular flange (68) of the first cover (50) is sealingly crimped (FIG. 2) to the annular flange (72) of the second cover (52) with the annular flange (76) of the end plate (58) disposed therebetween, the diaphragm (60) is securely held in place due to the radial and axial compression on the annular flange (90) of the diaphragm (60) disposed in said annular area (88). By axially and radially securing the diaphragm (60) in such a way, no part of the diaphragm (60) is crimped between the first and second housing covers (50, 52) as is typical in most conventional fuel pressure regulators. By eliminating the diaphragm (60) from the crimp, the life of the diaphragm (60) is greatly extended because there is less strain on the diaphragm (60). Thus, the crimping process is no longer a process variable that can effect the life of the diaphragm (60).

With the diaphragm (60) securely retained in place as just described, the diaphragm (60) divides the pressure regulator housing into two chambers; a high pressure upstream chamber (92) (FIG. 2) and a low pressure downstream chamber (94).

The cup-shaped diaphragm backing plate (62) is preferably adhesively bonded to the underside of the diaphragm (60) (FIG. 2) and includes a central aperture (96) coaxial with the central aperture (92) of the diaphragm (60). The cup-shaped diaphragm backing plate (62) receivingly restrains one end of the control spring (64). The other end of the control spring (64) is receivingly restrained by an annular lip (98) extending from the second cover (52) and around the outlet port (70).

Figure 6:
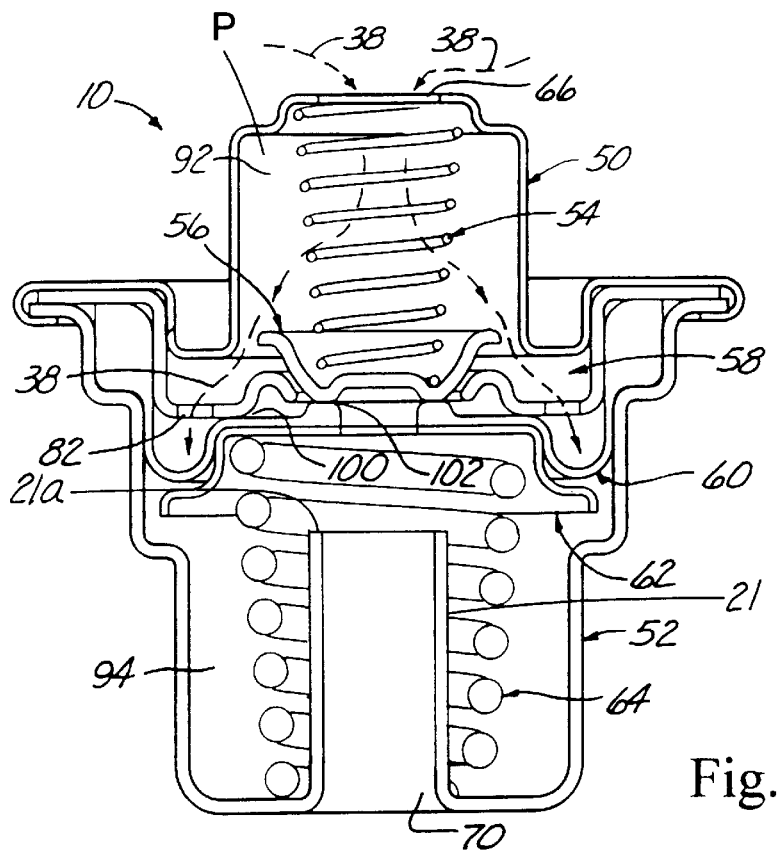
FIG. 6 is a detailed cross-section view of the fuel pressure regulator of the present invention showing the internal component positions and fuel flow when the pressure regulator is in the normally closed position.
Figure 7:
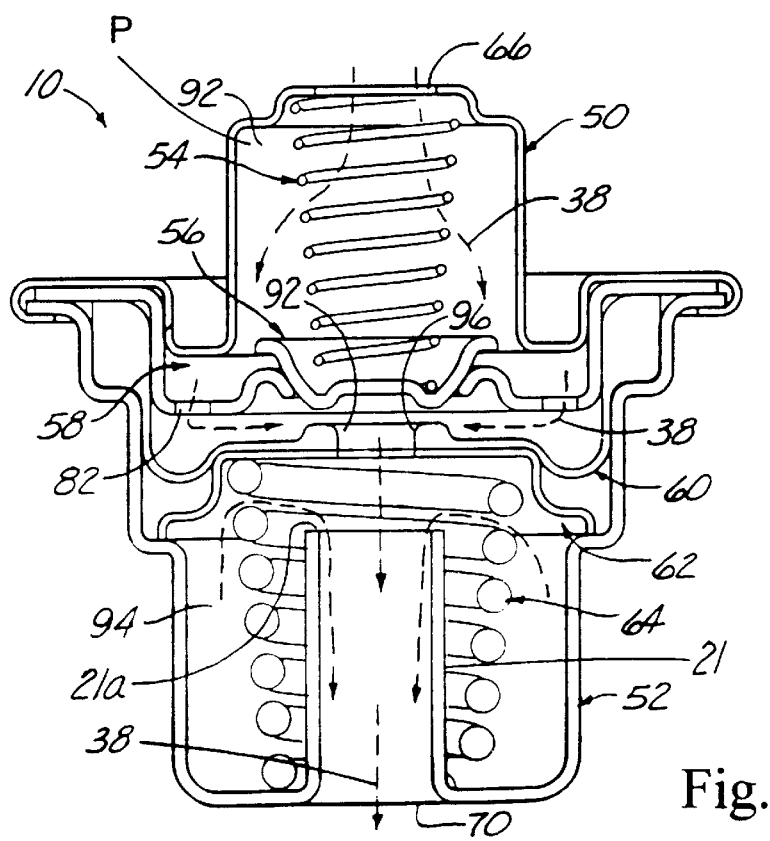
FIG. 7 is a detailed cross-sectional view of the fuel pressure regulator of the present invention showing the internal component positions and fuel flow when the pressure regulator is in the open position.

In FIGS. 6 and 7 a more detailed view of the operation of the pressure regulator (10) is illustrated. FIG. 6 illustrates the positions of the internal components and fuel flow when the fuel pressure regulator (10) is in the normally closed position. FIG. 7 illustrates the positions of the internal components and fuel flow when the pressure regulator (10) is in the open position. In the normally closed position (FIG. 6), the control spring (64) biases the diaphragm (60) against the end plate (58) creating a stop (100) at the plane of contact between the diaphragm (60) and the end plate (58). The control spring (64) also forces the diaphragm (60) against the annular sealing surface (87) of the valve member (54) creating a seal (102) at the plane of contact between the diaphragm (60) and the sealing surface (87) of the valve member (54). It should be appreciated that the seat spring (54) biases the sealing surface (87) of the valve member (56) downwardly against the diaphragm (60) so that the seal (102) is tightly fluidly sealed. It should also be appreciated that because the sealing surface (87) of the valve member (56) includes an indent (86) thereby forming the ring shaped sealing surface (87), a higher unit pressure is created at the seal (102) than could be achieved if the sealing surface of the valve member (56) was flat.

In the normally closed position (FIG. 6) fuel enters the pressure regulator (10) through the inlet port (66) in the first housing cover (50). As the fuel enters the upstream chamber (92) it is allowed to pass through the apertures (82) in the end plate (58) and also between the valve member (56) and the annular lip (84). The seal (102) prevents the fuel from escaping into the downstream chamber (94). As the pressure in the fuel line (32) and upstream chamber (92) begins to build, the diaphragm (60) will begin to deflect (FIG. 7). When the downward force on the diaphragm (60), due to the fluid pressure on the surface area of the diaphragm (60), begins to exceed the upward bias of the control spring (64), the control spring (64) is compressed or forced downwardly as viewed in FIG. 7. The downward bias of the seat spring (54) keeps the valve member (56) in contact with the diaphragm (60) thus maintaining the seal (102). As the control spring (64) is forced downwardly, the diaphragm (60) will move away from the stop (100). The seal (102) is maintained until the valve member (54) abuts the annular lip (84) of the end plate (58). As the downward pressure on the diaphragm (60) continues to build, the control spring (64) is further compressed downwardly. The abutting surfaces of the valve member (54) and the annular lip (84) (FIG. 7) prevents the valve member (56) from moving downward with the diaphragm (60) and the control spring (64) thus breaking the seal (102) thereby allowing the fuel to flow through the apertures (92, 96) of the diaphragm (60) and diaphragm backing plate (62) and into the downstream chamber (94) where the fuel exits the outlet port (70) and passes into the return port (28) of the fuel filter/regulator housing (22) (FIGS. 4 and 5) and into the return line (40) (FIG. 5) where the fuel is discharged back into the fuel tank (12) (FIG. 5). The return flow is indicated by dashed arrow lines (38) in FIGS. 4, 5 and 7.

It will be appreciated that the sealing force on the annular seal is determined by the spring constant of the seat spring (54). Additionally, it should be understood that the control spring (64) controls the operating pressure of the fuel pressure regulator (10). The higher the spring constant, the greater the bias of the diaphragm (60) against the end plate (58) and thus the greater the amount of pressure required to compress the control spring (64) axially downwardly. It should also be understood that when manufacturing the pressure regulator (10) of the present invention, the control spring (64) and seat spring (54) are loaded as the first housing cover (50) and second housing cover (52) are pressed toward one another and their respective flanges (68, 72) are crimped together.

Figure 11:
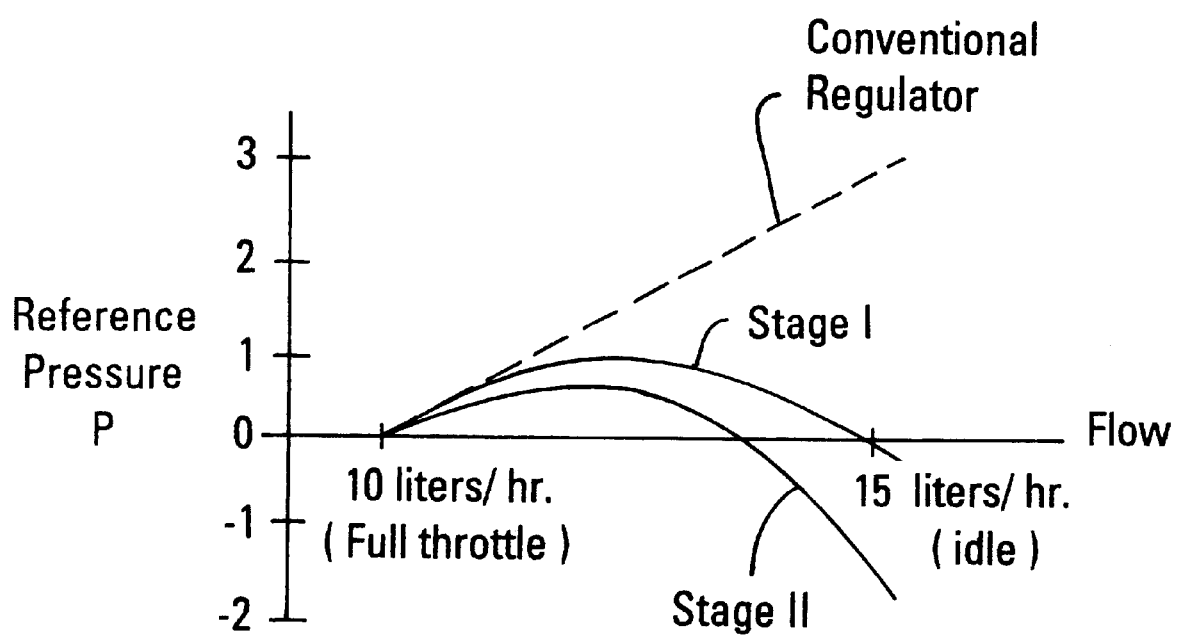
FIG. 11 shows a pressure-flow depiction of a conventional pressure regulator, and of both of the embodiments of the present invention.

In operation of the FIGS. 1–7 embodiment of the present invention, the tube (21) causes the flow chart to be like Stage I in FIG. 11 wherein as the reference pressure at (P) in chamber (92) increases, the flow back to the fuel tank initially increases and then decreases, but is a much flatter curve than that of a conventional pressure regulator represented by the dashed line in FIG. 11. This allows more flow to the engine when it is needed during the acceleration phase. The reason that this occurs is that as the flow passes directly through the opening (96) in diaphragm (60) to conduit (21) through opening (21a), fuel is sucked from chamber (94), increasing the flow through tube (21) and decreasing the pressure in chamber (94). This obviously changes the differential pressure between the pressure (P) in chamber (92), thereby closing the valve (56) against seat (96) quicker than it would have had the conduit (21) not been present.

Put another way, the conduit (21) acts as a venturi. As the flow from the seat (96) jets down into conduit (21), it creates a vacuum in the chamber (94) where the large spring (64) is located. This lowering of pressure in chamber (94) acts like a reduction in the spring rate of control spring (64). The vacuum effect in chamber (94) on the regulator performance is that, instead of just having a diaphragm area to spring force ratio resulting in a sloped line like the dashed line in FIG. 11, the pump side pressure in chamber (92) increases compared to what it would have if conduit (21) was not there. As the pump side pressure in chamber (92) increases and the pressure in chamber (94) decreases (due to the venturi effect of conduit (21)), this effectively decreases the force of the spring (64), which inherently increases as it becomes compressed.

The total force on the chamber (94) side of the diaphragm (60) is the force of the spring plus the force of the fluid pressure in chamber (94). So if the fluid pressure is reduced in chamber (94), the total force of chamber (94) side pressure is reduced due to the addition of conduit (21). This automatically makes more fuel available in chamber (92) and to the engine or fuel rail (34) when quick acceleration is desired because the pressure does not drop as quickly as with conventional pressure regulators. The FIGS. 1–7 embodiment has flow characteristics approximately as shown by the Stage I curve in FIG. 11, which shows how the flow through the pressure regulator does not increase as fast as in a conventional regulator, therefore allowing more fuel flow to the engine or fuel rail (31).

Figure 12:
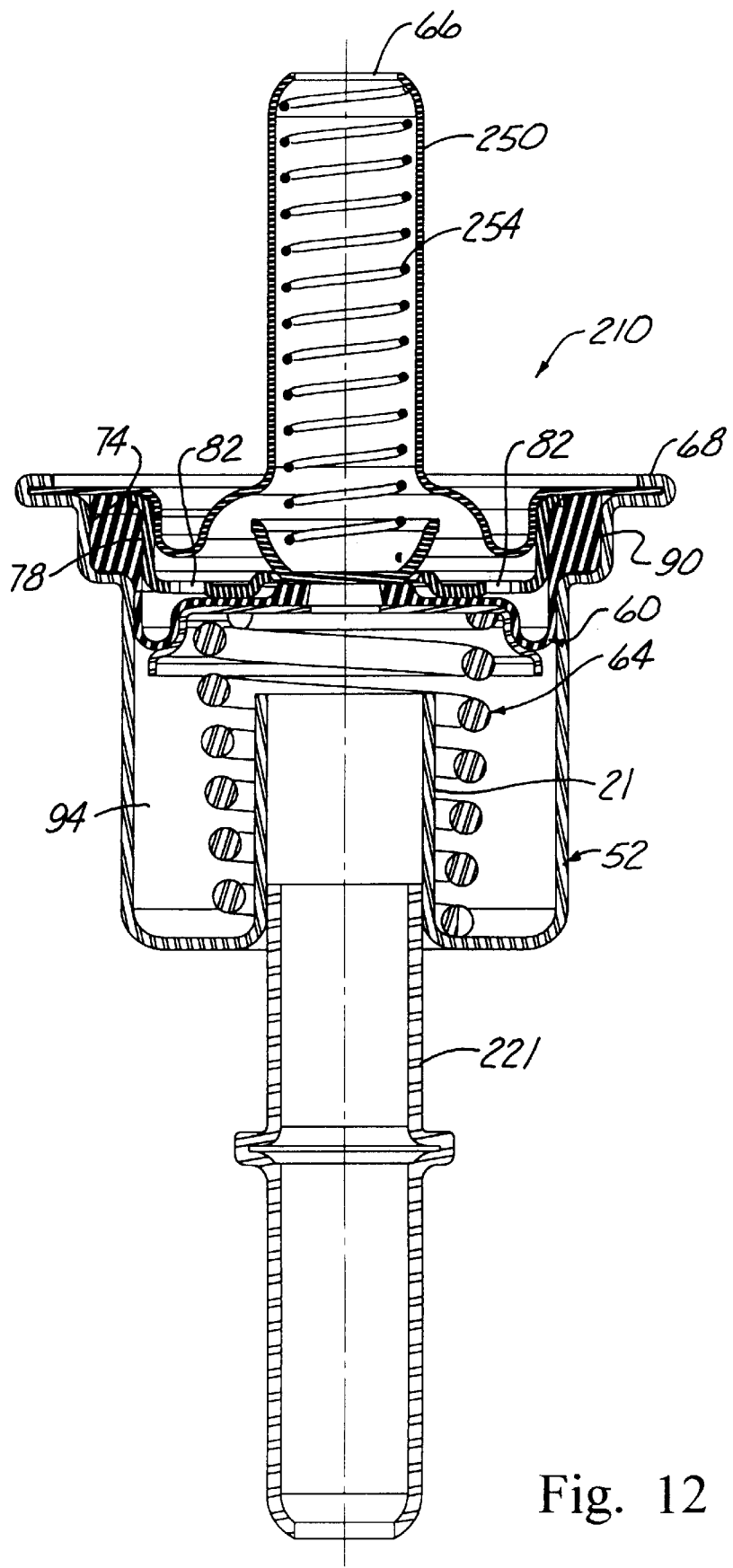
FIG. 12 is a cross sectional view of another embodiment similar to the FIG. 2 embodiment.

The FIG. 12 embodiment (210) works just like the FIG. 2 embodiment, but just has a few parts like top housing part (254), spring (250) and outlet tube (224) which are different than the FIG. 2 embodiment.

Figure 8:
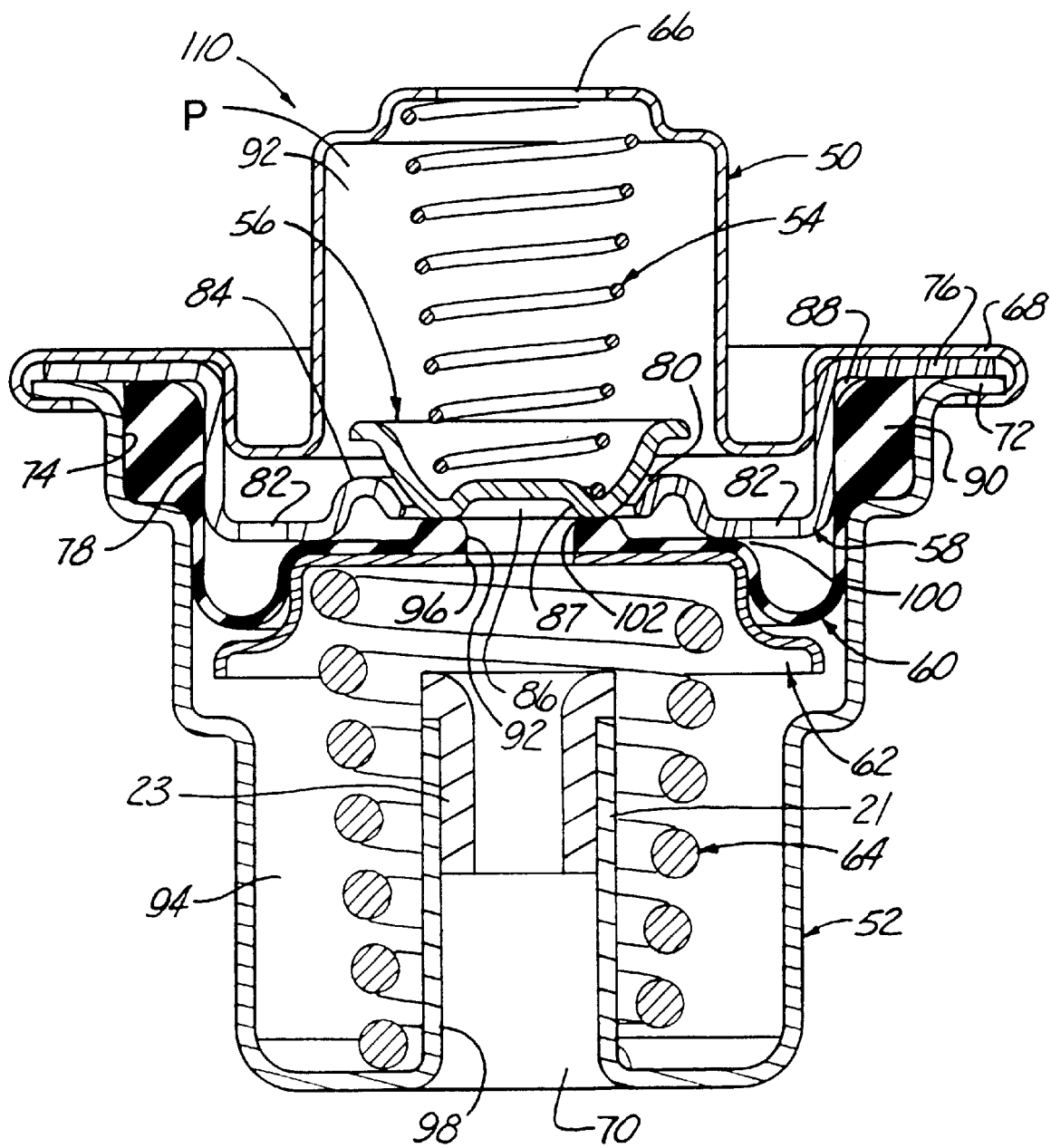
FIG. 8 is a cross sectional view of another preferred embodiment of the present invention, being like the FIG. 2 embodiment except for the addition of a venturi insert.
Figure 9:
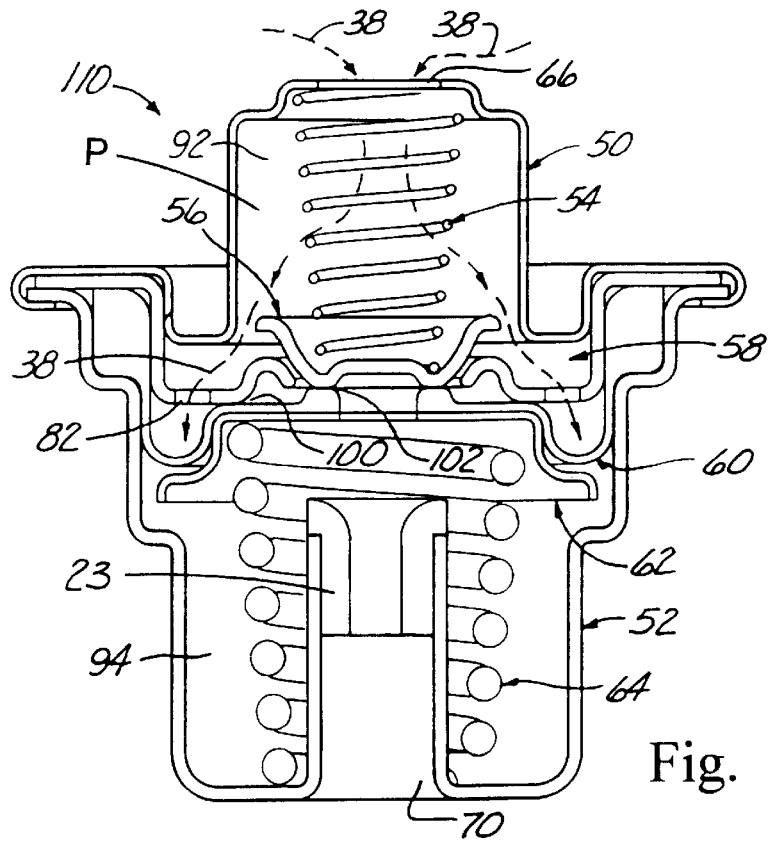
FIG. 9 is a detailed cross-section view of the fuel pressure regulator of the present invention showing the internal component positions and fuel flow when the pressure regulator is in the normally closed position.
Figure 10:
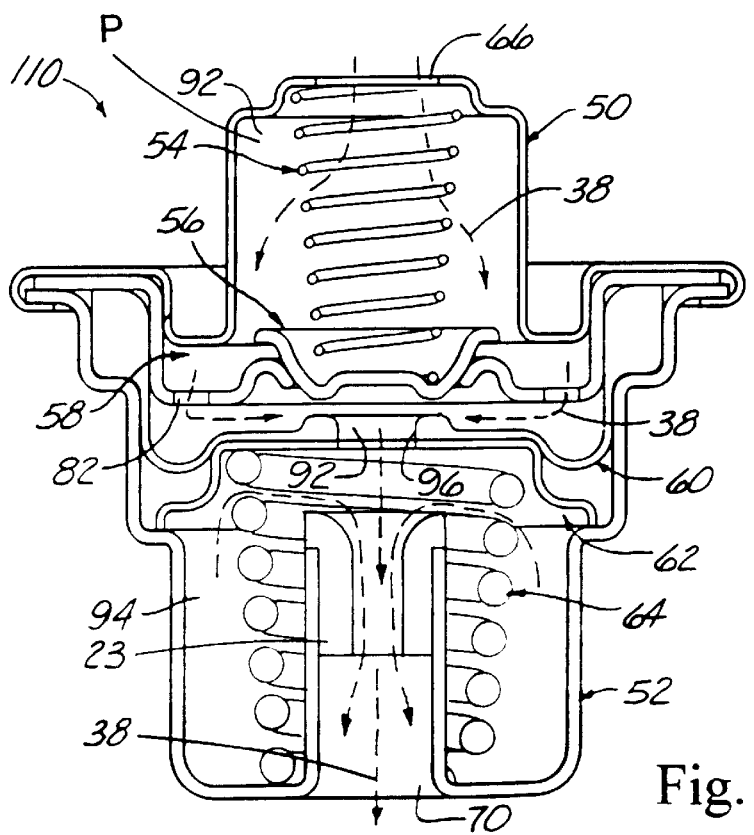
FIG. 10 is a detailed cross-sectional view of the fuel pressure regulator of the present invention showing the internal component positions and fuel flow when the pressure regulator is in the open position.
Figure 13:
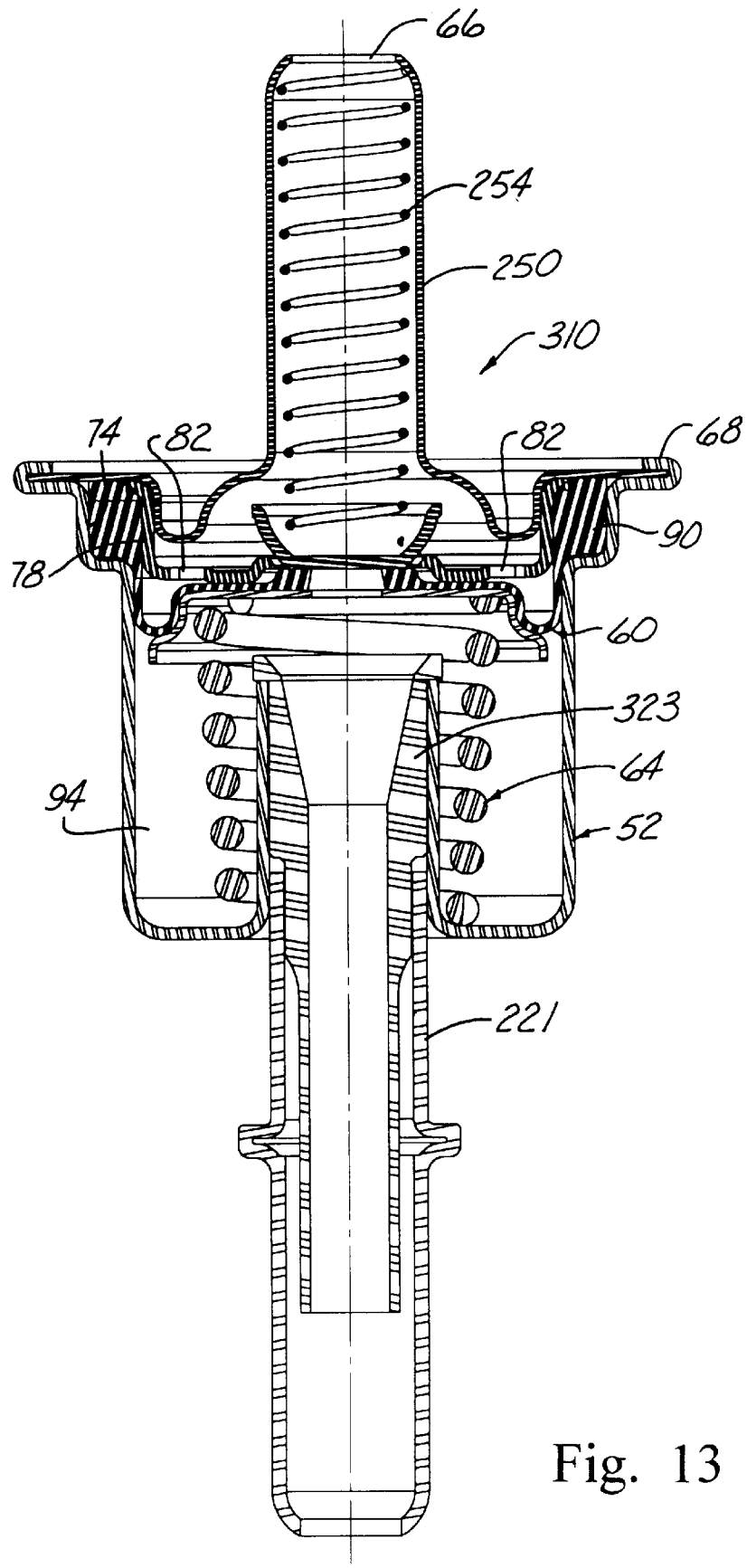
FIG. 13 is a cross sectional view of another embodiment similar to the FIG. 8 embodiment.

The operation of the FIGS. 8–10 embodiment and the FIG. 13 embodiment (310) work just like the FIGS. 1–7 embodiment except that the addition of the venturi insert (23) and (323) in conduit (21) increases the vacuum assist feature as shown in the Stage II part of the FIG. 11 chart, causing the flow through the pressure regulator (110) to decrease faster than in the FIGS. 1–7 embodiment. The FIG. 13 embodiment includes venturi insert (323) which is similar to venturi insert (23) of the FIG. 8 embodiment.

Although only exemplary embodiments of the invention have been described in detail above, those skilled in the art will readily appreciate that many modifications are possible without materially departing from the novel teachings and advantages of this invention. Accordingly, all such modifications are intended to be included within the scope of this invention as defined in the following claims.

We claim:

1. Apparatus comprising:
    a pressure regulator body having an inlet port and and an outlet port;
    a pressure regulator valve disposed in said pressure regulator body, said valve being moveable between an open and a closed position and being responsive to open or close the valve based at least in part on a differential pressure between the pressure in the outlet port and the pressure in the inlet port;
    a chamber in the pressure regulator body on the outlet port side of the valve; and
    a conduit having a fluid passageway therein extending from said outlet port into said chamber, said conduit having an inside and an outside and having an open end forming part of said fluid passageway, said open end being spaced from said valve thereby creating flow through the entire length of said conduit directly from the valve to said open end and pulling fluid which is located radially outwardly from said conduit in said chamber from said open end, through the inside of the conduit to said outlet port, thereby reducing the pressure in said chamber and causing a vacuum assist effect.

2. The apparatus of claim 1 wherein said chamber has a spring disposed therein biasing said valve toward the closed position thereof.

3. The apparatus of claim 1 wherein a venturi insert is disposed in said open end of said conduit for optimizing said vacuum assist effect.

4. The apparatus of claim 1 wherein said fuel pressure regulator comprises
    an end plate having an annular flange, an annular exterior periphery and a central aperture;
    said body including a housing comprising a first cover and a second cover, said first cover having an annular flange, said second cover having an annular flange and an annular interior periphery, said annular flanged first cover being mateably secured to said annular flanged second cover with said annular flanged end plate being receivingly secured therebetween;
    an annular area defined by said annular interior periphery of said second cover and said annular exterior periphery of said end plate; and
    a diaphragm having an annular flange and a central aperture coaxial with said central aperture of said end plate, said annular flange of said diaphragm being axially and radially restrained within said annular area, said diaphragm dividing said housing into an upstream chamber and a downstream chamber.

5. The fuel pressure regulator of claim 4 further comprising:
    a control spring acting to bias said diaphragm against said end plate;
    said valve including a valve member;
    a seat spring acting to bias said valve member against said diaphragm whereby said central aperture of said diaphragm is fluidly sealed by said valve member.

6. The fuel pressure regulator of claim 5 wherein said valve member includes an annular sealing surface.

7. The fuel pressure regulator of claim 6 wherein said diaphragm is an elastomer material.

8. The apparatus of claim 1 wherein said fuel regulator comprises:
    said body including a first housing portion in fluid communication with a fuel inlet port;
    said body also including a second housing portion in fluid communication with a fuel outlet port;
    an end plate axially and radially restrained between said first housing portion and said second housing portion, said end plate having a central aperture;
    a diaphragm axially and radially restrained between said first housing portion and said second housing portion and below said end plate, said diaphragm having a central aperture coaxial with said central aperture of said end plate;
    said valve including a valve member axially disposed over said central aperture of said end plate, said valve member having a sealing surface;
    a seat spring biasing said sealing surface of said valve member in sealing relation against said diaphragm; and
    a control spring biasing said diaphragm against said end plate;
    whereby fuel entering said first housing portion through said fuel inlet port exerts a pressure on said diaphragm, when said pressure on said diaphragm exceeds the bias of said control spring, said diaphragm causes said control spring to compress, said bias of said seat spring on said valve member maintaining said sealing relation of said sealing surface of said valve member against said diaphragm until said portion of said valve member abuts said end plate central aperture, whereby said sealing relation is broken allowing said fuel to pass from said first housing portion to said second housing portion through said diaphragm central aperture and out through said fuel outlet port.

9. The apparatus of claim 1 wherein said fuel pressure regulator, comprises:
    said body having a first housing portion in fluid communication with a fuel inlet port;
    said body further having a second housing portion in fluid communication with a fuel outlet port;
    an end plate axially and radially restrained between said first housing portion and said second housing portion, said end plate having a central aperture;
    a diaphragm disposed between said first housing portion and said second housing portion and below said end plate, said diaphragm having a central aperture coaxial with said central aperture of said end plate;
    said valve including a valve member axially disposed over said central aperture of said end plate, said valve member having a sealing surface, said sealing surface being radially inside of said central aperture of said end plate;
    a seat spring biasing said sealing surface of said valve member in sealing relation against said diaphragm; and
    a control spring biasing said diaphragm against said end plate;
    whereby fuel entering said first housing portion through said fuel inlet port exerts a pressure on said diaphragm, when said pressure on said diaphragm exceeds the bias of said control spring, said diaphragm causes said control spring to compress, said bias of said seat spring on said valve member maintaining said sealing relation of said sealing surface of said valve member against said diaphragm until said portion of said valve member abuts said end plate central aperture, whereby said sealing relation is broken allowing said fuel to pass from said first housing portion to said second housing portion through said diaphragm central aperture and out through said fuel outlet port.

10. The apparatus of claim 1 wherein said conduit is continuous along the length thereof, thereby having no openings therein from said outlet port to said open end.

11. Apparatus comprising:

a pressure regulator body having an inlet port and and an outlet port;

a pressure regulator valve disposed in said pressure regulator body, said valve being moveable between an open and a closed position and being responsive to open or close the valve based at least in part on a differential pressure between the pressure in the outlet port and the pressure in the inlet port;

a chamber in the pressure regulator body on the outlet port side of the valve; and a conduit having a fluid passageway therein extending from said outlet port into said chamber, said conduit having an inside and an outside and having an open portion forming part of said fluid passageway, said open portion being spaced from said valve thereby creating flow through said conduit directly from the valve to said open portion and pulling fluid which is located radially outwardly from said conduit in said chamber from said open portion, through the inside of the conduit to said outlet port, thereby reducing the pressure in said chamber and causing a vacuum assist effect, said conduit having an upstream end and a downstream end, said open portion being adjacent to said upstream end.

* * * * *